Feb. 14, 1933.   H. R. BRIDGEWATER   1,897,168
WEIGHING MECHANISM
Filed Feb. 14, 1930

INVENTOR.
H. R. Bridgewater

BY Lancaster, Allwine and Rommel
ATTORNEYS.

Patented Feb. 14, 1933

1,897,168

UNITED STATES PATENT OFFICE

HURLBERT R. BRIDGEWATER, OF DETROIT, MICHIGAN, ASSIGNOR TO PHILLIPS PETROLEUM COMPANY, OF BARTLESVILLE, OKLAHOMA, A CORPORATION

WEIGHING MECHANISM

Application filed February 14, 1930. Serial No. 428,479.

This invention relates to improvements in weighing mechanism.

The primary object of this invention is the provision of improved weighing mechanism particularly well adapted for the weighing of drums of liquid gas and the like for purposes more specifically described in a co-pending application of Paul S. Endacott, Serial No. 381,503, filed July 27, 1929; the present invention more particularly comprising a beam type of scale which with its supporting frame and associated mechanism may be conveniently carried by an operator in a balanced relation, and quickly and conveniently applied or removed with respect to a suitable support during the weighing of loads.

Other objects and advantages of this invention will be apparent during the course of the following detailed description.

In the accompanying drawing, forming a part of this specification, and wherein similar reference characters designate corresponding parts throughout the several views, Figure 1 is a side elevation, showing the improved weighing mechanism associated upon apparatus for the weighing of a specific type of load parts being broken away to disclose details.

Figure 5:
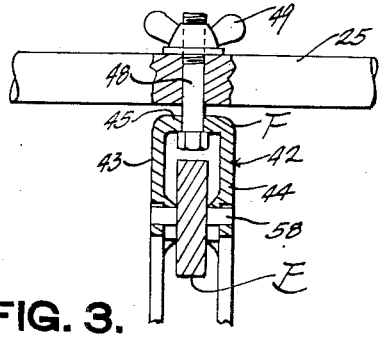
Figure 5 is an enlarged fragmentary sectional view showing the means by which a balance beam is connected to the weighing mechanism of the frame.

In the drawing, wherein for the purpose of illustration is shown only a preferred embodiment of the invention, the letter A may generally designate the improved weighing mechanism, which comprises a frame B adapted to be removably mounted upon a housing C for the weighing of a drum D or other load therein. The housing C may of course be of any type of support. The frame B has associated therewith a balance beam E which has been made the subject matter of a co-pending application of Rosswell W. Thomas, Serial No. 428,505, filed Feb. 14, 1930, and which is operatively connected with the frame B by means F, shown more particularly in Figure 5 of the drawing; the balance beam E supporting means G for receiving the load.

The load D may be a drum adapted to receive liquefied gas, usable for domestic purposes, and the consumption of which is gauged on the premises by means of weighing. The drum D is movably supported within a cylindrical housing C and may rest upon a foundation 10. A cover 11 may close the drum within the housing C. The weighing mechanism A is applied to the housing C with the frame B resting on the top thereof during a weighing operation.

Figure 3:
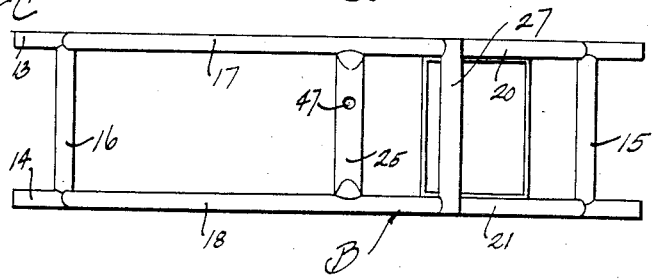
Figure 3 is an enlarged plan view of the frame of the weighing mechanism.
Figure 4:
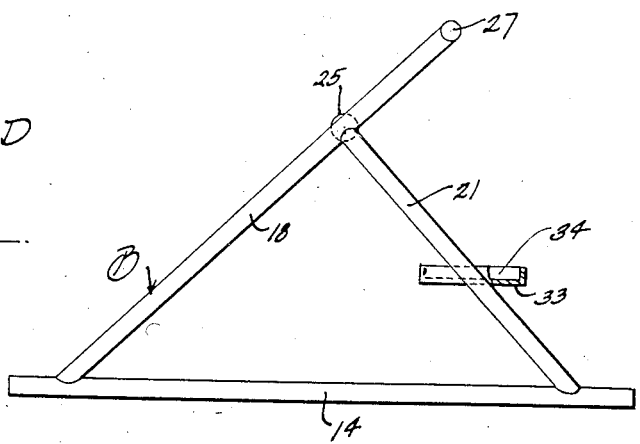
Figure 4 is an enlarged side elevation, partly in section, of the frame of the weighing mechanism.

The frame B is preferably constructed of welded tubular stock and comprises parallel supporting, runner-like base bars 13 and 14, which are connected in parallel spaced relation by means of cross bars 15 and 16 adjacent opposite ends thereof, which are welded thereto in the relation shown in Figure 3 of the drawing. A pair of inclined, parallel bars 17 and 18 are welded at their lower ends in acute angled relation with the bars 13 and 14 respectively, adjacent the cross bar 16. These bars 17 and 18 extend diagonally upward when the supporting bars 13 and 14 rest horizontal, as is quite apparent. At their opposite ends the bars 13 and 14 have respectively secured therewith inclined parallel bars 20 and 21 which are welded to their respective bars adjacent the cross bar 15, and which extend in acute angled relation with respect to the runner-like bars, in convergent relation with respect to the bars 17 and 18 respectively, to which they are respectively welded intermediate the ends of the bars 17 and 18, but closer to the upper ends thereof than the lower ends. The bars 17 and 20 are arranged to form an inverted V as are also the bars 18 and 21. The connecting ends of the bars 20 and 21 with respect to the bars 17 and 18 are welded, and at such location a heavy cross beam 25 is provided, which is adapted to receive the means F by which the balance beam and load are supported. The bars 17 and 18 are respectively connected with the bars 20 and 21 normal to the latter, and the ends of the bars 17 and 18 extend beyond the cross beam 25, and at their upper ends are connected by a handle 27. It is of course understood that all of the bars of the frame B are straight, and while they may be otherwise shaped if desired, the arrangement is simple and economical to construct.

Intermediate their ends the bars 20 and 21 support a sheet metal tray or platform 33, which is welded or otherwise affixed thereto between the bars 20 and 21, preferably providing an upwardly facing compartment 34 adapted to receive the sliding weight or poise of the balance beam therein, during inoperative positioning of the details of the weighing device, which will permit the same to be carried by an operator grasping the handle 27, in a balanced relation. The material of the frame B, including the sheet metal tray 33, may be of galvanized metal, or any other approved material. It is to be noted that the handle 27 directly overlies the tray 33, which in the instant case is also the center of gravity.

The beam E is of the elongated balance beam type, having an improved sliding weight construction or poise 40 thereon, which has been made the subject matter of another application. The beam E intermediate its ends is connected by the means F to the cross beam 25. The means F preferably comprises an inverted U-shaped yoke 42, shown in Figure 5, and includes leg portions 43 and 44 and a bight 45. The frame beam 25 has an opening 47 therethrough, into which the upper screw threaded end of a bolt 48 extends; the latter being extended through an aperture in the bight portion 45 of the yoke 42, for supporting the latter from the beam 25; a wing nut 49 being adjusted on the screw threaded end of the bolt 48 to detachably connect the same upon the frame beam 25, in a relation which is apparent from Figure 5.

The means G may comprise an extensible device, such as a windlass drum 50 rotatably supported in an inverted U-shaped yoke 52; the said drum 50 being of the grooved pulley type, and adapted to receive a chain 53, or it may be a cable wound spirally thereon. A suitable pawl 54 may operate upon the pulley 50 to hold the same in the yoke 52 against rotation, as has been set forth in a co-pending application of Rosswell W. Thomas, Serial No. 428,504, filed Feb. 14, 1930. The yoke 52 has an upwardly extending supporting shank 55, which is pivoted at 57 upon the balance beam E.

The balance beam E is pivotally connected at 58 upon the legs 43 and 44 of the yoke 42, offset a slight distance longitudinally of the beam E from the pivot 57, in the usual manner. The chain cable 53 is provided with a supporting hook 55$^a$ adapted to connect upon suitable eye or strap 55 secured upon the top of the drum D.

Figure 1:
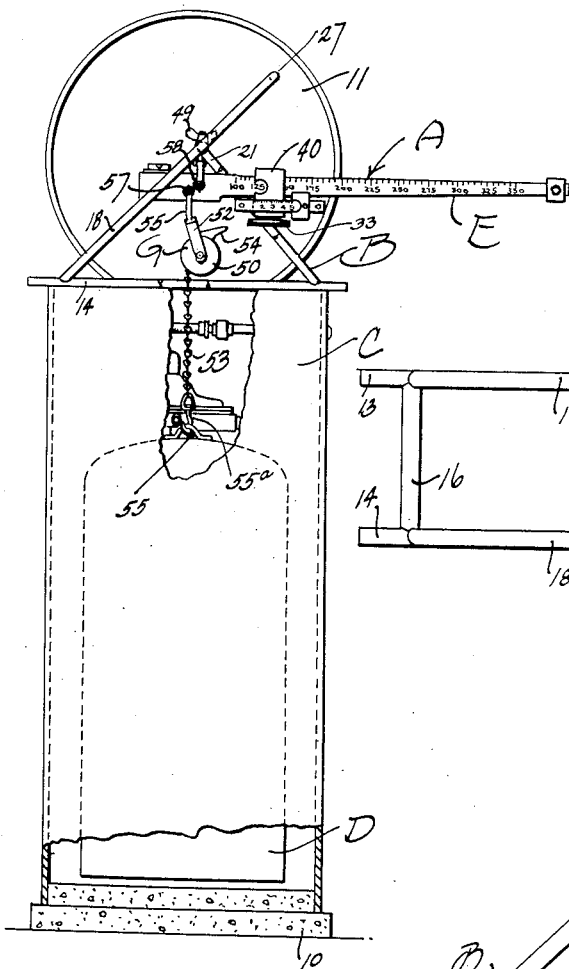
Figure 2:
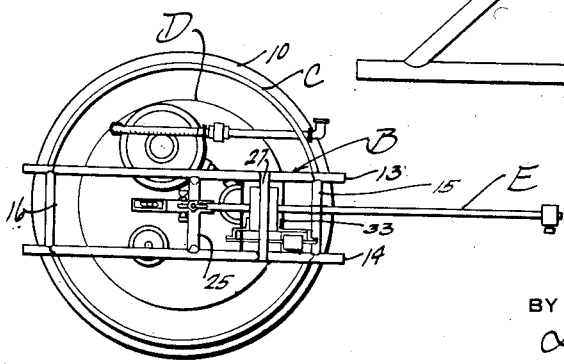
Figure 2 is a plan view of the weighing mechanism of Figure 1, showing it mounted upon its support and with respect to a load.

With respect to the use of the weighing apparatus, it is remembered that the same should be readily portable between a truck and the load, since in the specific use in which it is intended to apply the same, the operator travels from house to house, weighing the various liquid gas containers to ascertain the amount of gas consumed. In use, the operator removes the cover of the housing B and places the runner-like bars 13 and 14 of the frame B across the top of the housing C. The beam E is preferably manually tipped upward at its free swinging end to lower the hook 55$^a$ of the chain or cable 53 into the housing C, and the windless pulley 50 is operated to permit the chain 53 to unwind therefrom to the desired extent and the hook 55$^a$ is placed in the eye 55 of the load or drum D. If the chain 53 is not vertical when so hooked, the frame B may be shifted, the runner-like bars 13 and 14 sliding over the top of housing C until the chain is vertical. The pulley 50 is then rotated to tighten the chain or cable 53, and thereafter the weight 40 is adjusted upon the balance beam until the load D has been lifted slightly from the foundation 10, as shown in Figure 1, to ascertain the gross weight of the load D. To release the weighing apparatus the free end of the beam E is lifted upwardly to replace the load D upon its foundation 10, and thereafter the drum of the windlass may be operated to release the cable 53. The operator slides the weight 40 upon the beam E to place it over the tray or platform 33, and it will come to rest in the platform, for supporting the beam E substantially horizontally. The operator may then grasp the handle 27 and lift the entire weighing mechanism. The parts are arranged so that when the weight 40 rests in the tray 33 the weighing apparatus will be balanced at opposite sides of the handle 27, so that the operator may readily transport the weighing mechanism without the same tipping eccentrically.

Various changes in the shape, size, and arrangement of parts may be made to the form of invention herein shown and described, without departing from the spirit of the invention or the scope of the claims.

I claim:

1. In weighing apparatus the combination of a supporting frame, a balance beam, means pivotally mounting the balance beam upon the supporting frame in suspended relation therefrom, a weight slidable on the balance beam, and a support on the frame for receiving the said weight therein to support the beam through the weight in a rest position inoperative upon the frame.

2. As an article of manufacture a frame for weighing apparatus comprising a supporting base and rigidly connected upwardly extending convergent portions, said portions being connected together at their meeting ends spaced above the base, means at the meeting ends for supporting a scale, and a tray providing an upwardly facing compartment for supporting the poise of the scale, connected to one of said convergent portions between the base and the meeting ends thereof.

3. As an article of manufacture a frame for weighing apparatus comprising a supporting base having rigidly connected upwardly extending convergent portions, said portions being connected together at their meeting ends spaced above the base, means at the meeting ends for pendently supporting a scale, a tray connected upon one of said portions between the base and the meeting ends of said portions for supporting the weights of the scale, one of said portions extending beyond the meeting ends of said portions and having a handle spaced above the meeting ends of said portions and directly above said tray.

4. In a frame structure for weighing mechanism the combination of a pair of parallel runner-like base bars, a pair of parallel upright bars connected at their lower ends to points adjacent but spaced from corresponding ends of the base bars and extending upwardly thereabove in acute angled relation therewith, a second pair of parallel upright bars connected at their lower ends to points adjacent but spaced from the opposite ends of the parallel base bars and extending in acute angled relation therewith in convergent relation with the upright parallel bars first mentioned and connected with the latter in rigid relation at a location spaced above the base bars, cross bars connecting the base bars at points adjacent the ends thereof, a cross beam rigidly connecting the meeting ends of the upright bars, and means on the beam for supporting a scale.

5. In a frame structure for weighing mechanism the combination of a pair of parallel base bars, a pair of parallel upright bars connected at their lower ends to corresponding end portions of the base bars and extending upwardly thereabove in acute angled relation therewith, a second pair of parallel upright bars connected rigidly with the opposite ends of the parallel base bars and extending in acute angled relation therewith and in convergent relation with the upright parallel bars first mentioned and connected with the latter in rigid relation at a location spaced above the base bars, cross bars connecting the ends of the base bars, a cross beam rigidly connecting the meeting ends of the upright bars, means on beam for supporting a scale, and a weight supporting tray connected between a pair of the parallel upright bars spaced above the base and below the meeting ends of said pairs of parallel upright bars, one of said pairs of parallel bars extending beyond the meeting ends of said pairs of parallel bars and having a cross handle spaced above said tray.

6. In weighing mechanism, the combination of a portable supporting frame having a carrying handle at its uppermost portion, a scale including a balance beam operatively connected to the frame below the handle thereof, load attaching means operatively connected with the balance beam, and a weight movable on said balance beam; and, means on the frame for supporting said scale weight in a definite position on said beam and with respect to the handle, with the frame and scale substantially balanced to each side of a vertical line passing thru the handle, so that the weighing mechanism may be carried in a balanced pendent position by said handle.

7. In a frame structure for weighing mechanism, the combination of a pair of spaced parallel runner-like base bars, a pair of companion upright bars connected at their lower ends to adjacent ends of the base bars and extending upwardly thereabove in acute angular relation thereto, a second pair of companion upright bars connected at their lower ends to the other adjacent ends of said base bars and extending upwardly thereabove in acute angular relation thereto, in convergent relation with and secured to the upper ends of the first mentioned companion upright bars, said second mentioned companion upright bars extending diagonally and upwardly beyond the junctures with said first mentioned companion upright bars, a cross bar connecting the upper ends of said second mentioned companion upright bars, serving as a carrying handle, a cross bar connecting said pairs of upright bars at their junctures, and means on the last mentioned cross bar for supporting a scale.

HURLBERT R. BRIDGEWATER.